Figure 1:
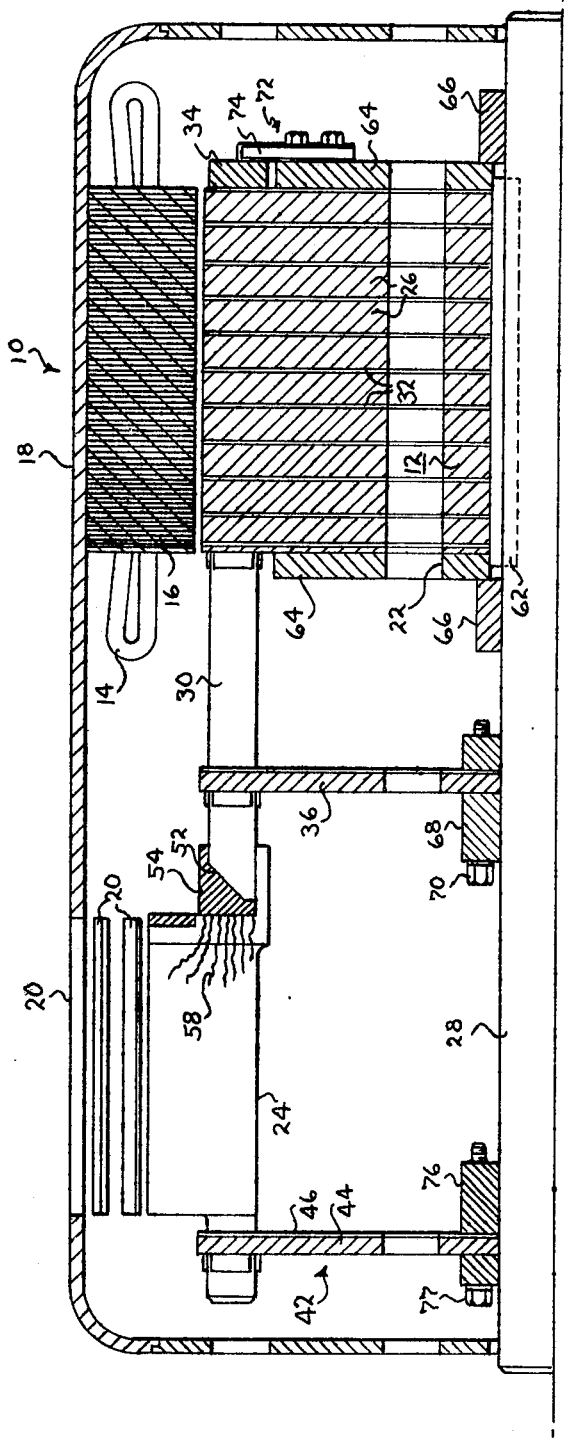

United States Patent

Wielt

[15] 3,662,195
[45] May 9, 1972

[54] HIGH SLIP INDUCTION MOTOR HAVING AN END RING FORMED OF BIFURCATED MEMBERS

[72] Inventor: Warren Pierce Wielt, Schenectady, N.Y.
[73] Assignee: General Electric Company
[22] Filed: Oct. 26, 1970
[21] Appl. No.: 84,024

[52] U.S. Cl. .................................. 310/64, 310/211, 310/270
[51] Int. Cl. .......................................................... H02k 9/22
[58] Field of Search ............. 310/64, 65, 211, 270, 260, 310/261, 262, 216, 217

[56] References Cited

UNITED STATES PATENTS 1,685,677   9/1928   Maxwell .............................. 310/64 X

FOREIGN PATENTS OR APPLICATIONS 1,071,827   12/1959   Germany ............................. 310/211

Primary Examiner—J. D. Miller
Assistant Examiner—B. A. Reynolds
Attorney—John J. Kissane, James C. Davis, Jr., Frank L. Neuhauser, Oscar B. Waddell and Joseph B. Forman

[57] ABSTRACT

A high slip induction motor is described wherein the protruding ends of extended aluminum rotor bars are interconnected by cast aluminum end ring strips having an elongated radial length to function as a fan maximizing heat transfer from the rotor bars. The strips preferably are a bifurcated design with a protruding nose at the interconnected end of the strips remote from the rotor bars while juxtaposition of the bifurcated strips forms a pocket between adjacent strips to snugly receive the rotor bars which are then welded to the strips. Radial and arcuate restraint of the extended end of the rotor is achieved by support wheels formed of rotor laminations situated at both ends of the end ring strips to receive the extended rotor bars and protruding noses, respectively, within the conductor slots of the laminations.

6 Claims, 4 Drawing Figures

INVENTOR.
WARREN P. WIELT

BY [signature]

HIS ATTORNEY

3,662,195

HIGH SLIP INDUCTION MOTOR HAVING AN END RING FORMED OF BIFURCATED MEMBERS

This invention relates to a dynamoelectric machine and in particular, to a high slip induction motor having extended rotor bars interconnected by high heat transfer end ring strips.

In many industrial applications, e.g., sugar centrifugal motors, it is desirable that the drive motor be characterized by a high starting torque which torque permissibly can drop as the motor accelerates to running speed. While such motor characteristics obviously can be obtained from either a direct current motor or a wound rotor motor, the labor costs involved in winding such motors have given impetus to the fabrication of less expensively constructed squirrel cage motors having similar torque characteristics.

Among techniques heretofore proposed to produce high starting torque in squirrel cage motors is the utilization of high resistance rotor bars within the motor. However, because the heat generated by current flow through the high resistance rotor bars is difficult to dissipate, a particularly preferred design for high starting torque squirrel cage motors utilizes low resistance rotor bars with at least one end of the rotor bars protruding outwardly from the rotor laminations. Typically, an end ring of radially enhanced dimension is employed to interconnect the protruding ends of the rotor bars remote from the stator to provide additional rotor bar resistance desired for high starting torque while maximizing heat transfer at an easily ventilated location within the motor.

The end ring design conventionally has been formed phosphorous bronze strips which are riveted to the protruding ends of the rotor bars whereafter the strips are encompassed by a plurality of, e.g., three, banding wire turns to restrain radial displacement of the end ring strips. The large quantity of banding wire circumferentially wrapped about the strips, however, limits circulation of air between the strips and reduces the fan action produced by the rotating strips during motor operation. Moreover, the banding wire can become loosened after repeated accelerations adversely affecting the average life expectancy of the motors.

It is therefore an object of this invention to provide an extended bar rotor dynamoelectric machine having improved reliability and superior cooling.

It is also an object of this invention to provide an extended bar rotor dynamoelectric machine wherein the end ring strip support does not interfere with strip cooling.

It is a further object of this invention to provide an extended bar rotor dynamoelectric machine wherein the end ring strips are supported without banding wire.

These and other objects of this invention generally are achieved within an extended bar rotor dynamoelectric machine by the utilization of an end ring strip having axially protruding noses which permit radial restraint of the strip without interfering with air flow between the strip. A dynamoelectric machine in accordance with this invention therefore generally would include a rotor formed of a plurality of magnetic laminations stacked in alignment upon a shaft to provide axially aligned slots for insertion of conductor bars therein. The conductor bars are asymmetrically disposed within the rotor to protrude from one end thereof and high resistance end ring strips of a bifurcated configuration serve to interconnect the protruding ends of adjacent conductor bars. Characteristically, the end ring strips have dual radially elongated bodies connected at the end remote from the conductor bars and a pocket is formed between adjacent strips at the end proximate the bars to snugly receive the conductor bars therebetween. A nose also extends outwardly from the interconnected end of the end ring strips and suitable support means, e.g., a suitably insulated magnetic rotor lamination, is secured to the protruding noses to restrain radial and arcuate movement of the bifurcated strips. Because no banding is required to circumferentially enclose a portion of the outermost periphery of the end ring strips, air circulation between adjacent strips is maximized.

Figure 4:
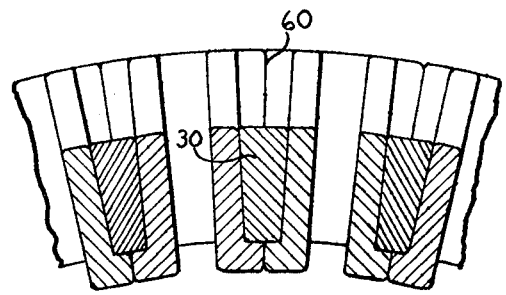
Figure 3:
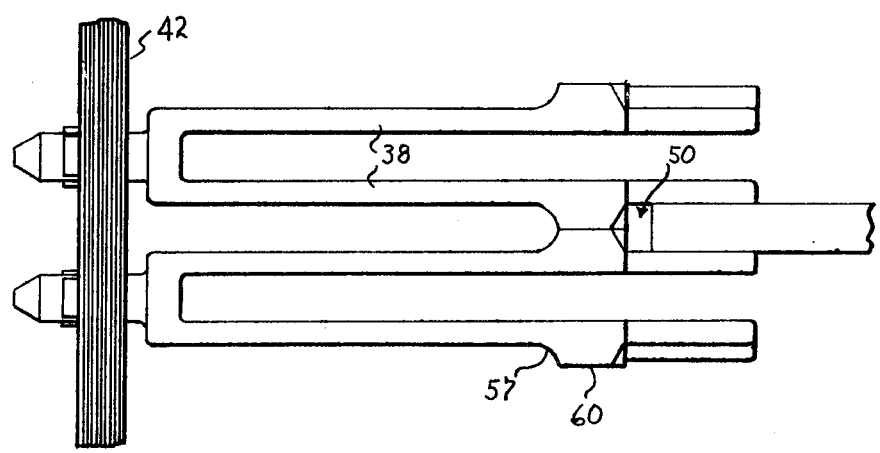
Figure 2:
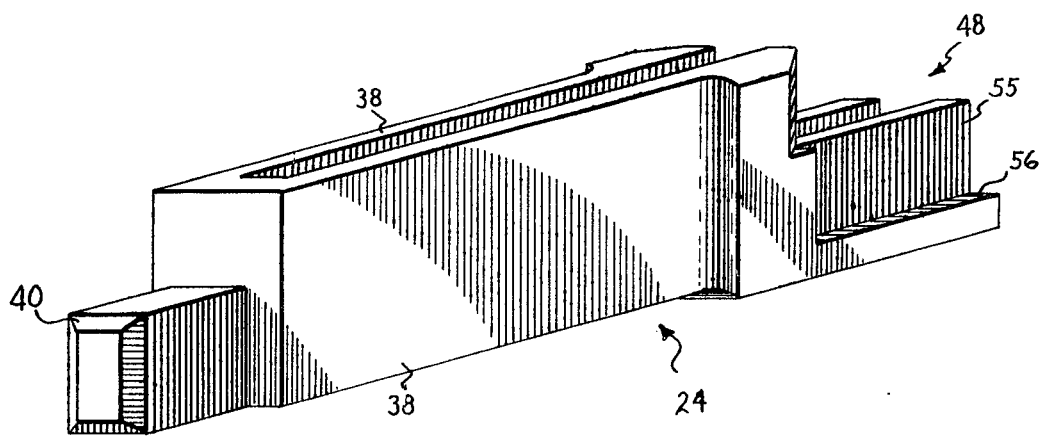

While the specification concludes with claims particularly pointing out and distinctly claiming that which is regarding of the present invention, a more complete understanding of the invention can be obtained from the following detailed description of various specific embodiments taken in conjunction with the accompanying drawings wherein:

FIG. 1 is a partially broken away, sectional view of a dynamoelectric machine in accordance with this invention, FIG. 2 is an isometric view of an end ring strip formed in accordance with this invention, FIG. 3 is a top view illustrating adjacent end ring strips taken along lines 3—3 of FIG. 1, and, FIG. 4 is an end view of the end ring strips taken along lines 4—4 of FIG. 1.

A squirrel cage motor 10 formed in accordance with this invention is illustrated in FIG. 1 and generally includes a rotor 12 having a stator winding 14 of conventional configuration circumferentially disposed about the rotor to magnetically interact therewith, upon energization of the stator winding, for driving the rotor. The stator winding in conventional fashion extends through aligned slots in laminated stator core 16 and the entire stator is enclosed within a housing 18 having ventilation slots, e.g., slots 20, disposed therein to permit cooling of the motor by the passage of air therethrough. While some cooling of the rotor is achieved by flow of air through passages 22 extending axially through the rotor, the primary means of rotor cooling is by conduction of heat to air flowing across extended end ring strips 24 (to be more fully explained hereinafter). Desirably, fins (not shown) are provided adjacent slots 20 to direct air outwardly from the motor.

Rotor 12 primarily is formed of a plurality of sheet metal laminations 26 of generally annular configuration having a central aperture for axially mounting the laminations upon shaft 28 while a plurality of spaced apart axially registered slots punched within the periphery of the laminations permit insertion of rotor bars 30 therein. Desirably, rotor bars 30 are insulated from the rotor laminations by insulating laminations 32 situated between magnetic laminations at axially displaced intervals, e.g., every 0.6 inches, in accordance with the teachings of co-pending U.S. patent application, Ser. No. 72,461, entitled INSULATED BAR DYNAMOELECTRIC MACHINE and METHOD OF FORMING, filed in the name of T.P. Pettersen and assigned to the assignee of the present invention. The insulating laminations characteristically are slit in registration with the adjacent slots in the motor laminations and the slit sections fold back during barring to insulate the rotor bar from the laminations. The insulating laminations typically can be formed of any heat resistant material, e.g., Mylar, Nomex, etc., capable of withstanding a 90° fold at room temperature without fracturing. In conventional extended rotor bar fashion, one end of rotor bars 30 protrude outwardly from the stacked rotor laminations to extend beyond the end turns of stator winding 14 while the opposite end of the rotor bars are terminated in conventional fashion by welding to aluminum end ring 34 underlying the stator end turns.

Because of the large cantilever forces exerted upon the extended rotor bars during operation, a support wheel 36 is axially mounted upon rotor shaft 28 to peripherally receive and constrain the extended ends of the rotor bars remote from the laminations. Support wheel 36 desirably is formed of a plurality of sheet metal laminations identical to sheet metal laminations 26 of rotor 12 to assure precise registration between the support wheel and the rotor bars while reducing the number of component parts required for fabrication of the motor. In general, approximately five to fifteen 19-mil thick sheet metal laminations generally have been found suitable for retaining the ends of 1 × 0.4 inch aluminum conductor bars protruding approximately 4.6 inches from a rotor designed to rotate at speeds up to approximately 1,800 rpm. Insulating laminations juxtaposed with the sheet metal laminations in the support wheel serve to insulate the support wheel from the rotor bars extending therethrough.

End ring strip 24 employed to interconnect adjacent rotor bars 30 is illustrated in FIG. 2 and generally is a bifurcated structure having dual sections 38 typically characterized by a radial dimension at least twice the radial dimension of the rotor bars to act as a fan impelling air from the rotor interior through slots 20 in the motor housing. The ends of sections 38 remote from the rotor are interconnected and a nose 40 extends axially outward therefrom to permit support of the outermost extension of the strips within strip support wheel 42 illustrated in FIG. 1. Desirably, support wheel 42 is identical to support wheel 36 and comprises a plurality of magnetic rotor laminations 44 juxtaposed with insulating laminations 46 to electrically insulate nose 40 from the magnetic laminations upon a folding back of the pre-slit insulating lamination leaves during insertion of end ring strip nose into the conductor slots within the laminations. To assure a snug fit between nose 40 and the support wheel, the cross-sectional area of the nose is geometrically identical to the cross-sectional area of the rotor conductors although the outermost tip of the nose preferably is tapered for ready insertion within support wheel 42.

An L-shaped region 48 extends from the ends of sections 38 proximate the rotor bars to form pocket 50, illustrated in FIG. 3, upon juxtaposition of the bifurcated end ring strips. Desirably, the ends of rotor bars 30 extending into the pocket terminate short of radially elongated sections 38 and have a tapered upper face 52 producing a mechanically and electrically secure joint upon filling of the remainder of the pocket with weld material 54. To secure a snug fit of the rotor bars within pocket 50 formed between juxtaposed strips, the bottom of L-shaped region 48 is dimensioned slightly in excess of one-half the thickness of the rotor bars while the upwardly extending side 55 of the L-shaped section desirably extends to a height slightly in excess of the radial height of the rotor bars to produce a button of weld material atop the radially outer surface of the rotor bars. The lower face 56 of pocket 50 lies within the same axial plane as the lower face of protruding nose 40 to permit utilization of main rotor laminations for support wheels 36 and 42.

As can be seen more clearly in FIG. 3, the thickness of elongated sections 38 increases adjacent pockets 50, desirably at least doubling in thickness proximate the pockets, to space apart sections 38 of adjacent end ring strips while increasing the conductivity of the strips in a vertical direction to more equally distribute current flow from the rotor conductors into the strips. Desirably, the increase in the width of the sections should be gradual, e.g., by means of radius 57 or a chamfer, to inhibit the formation of stress risers at the junction between the pockets and the end ring strips. Tests have shown this junction to be a critical zone susceptible to failure when an abrupt change, i.e., a 90° change, occurs between surfaces. Because of the increased conductivity of the widened section, current flow within the strips is directed upwardly, as illustrated by conduction lines 58 in FIG. 1, to be homogeneously distributed along the end ring strips.

Referring now to FIG. 4, the thickness of the widened portion of elongated sections 38 increases with radial span from the shaft to abut the juxtaposed faces 60 of adjacent end ring strips. The abutted faces also desirably are flattened to maximize contact and equally distribute stress forces along the contacting faces. It will be appreciated that the weld material within pocket 50 not only secures the rotor bars to end ring strips 24 but also secures elongated sections 38 of one end ring strip to a similar section of the adjacent end ring strip. Additional strength for the joint also is obtained by depositing weld material along the juncture between abutting faces 60.

To form rotor 12 in accordance with this invention, key 62 is inserted in an axial slot within rotor shaft 28 and sheet metal laminations 26 are stacked upon the shaft with the key slot of each lamination producing in axial alignment of the conductor slots within the laminations. At pre-determined intervals, e.g., approximately every 0.6 inch, an insulating lamination 32 having slits of X-configuration at the location of the conductor slots is inserted between the sheet metal laminations. As taught in the heretofore mentioned Pettersen application, a plurality of insulating laminations having H and/or C shaped slits desirably are disposed at opposite ends of the rotor where the centrifugal forces acting upon the rotor bars are maximized. Annular flanges 64 then are mounted at opposite ends of stacked laminations and the stacked laminations are compressed, e.g., by a force of 40 tons for an 8 inch stack of 4 inch diameter laminations whereupon rings 66 are shrunk upon the shaft to retain the rotor laminations in a compressed state. At a span approximately 4.6 inches from the rotor, support wheel 36 (consisting of approximately thirteen 0.02 inch thick rotor laminations situated remote from the rotor and three insulating laminations proximate the rotor) is mounted upon the shaft and, after shrinking ring 68 to the shaft, the support wheel is fixedly secured to the shrink ring by bolts 70. Rotor bars 30 then are inserted into the stacked laminations from rotor end 72 and the leaves of the insulating laminations are folded back by the advancing rotor bar to insulate the sheet metal laminations from the rotor bars. After aluminum end ring 34 is welded to the rotor bars adjacent end 72, a suitably insulated plate 74 is secured to flange 64 to inhibit axial slippage of the rotor bars when the motor is to be operated in a vertical position.

A plurality of cast aluminum end ring strips 24 equal in number to the rotor bars then are wedged into position with a rotor bar within each of pockets 50 formed between adjacent strips and the pockets are filled with aluminum weld material securing the end ring strips in location. After shrink ring 76 is mounted upon shaft 28, the punched conductor slots in the sheet metal lamination of support wheel 42 are registered with protruding noses 40 and the support wheel is moved axially inward to fold back the leaves of the insulating laminations over the conductor slots. The support wheel then is secured to shrink ring 74 by bolts 77 to restrict radial and arcuate motion of the end ring strips. Because no banding is required about the radial outer periphery of the end ring strips, circulation of air between strips is maximized.

In general, for an 8 inch rotor stack, having 1 × 0.4 inch aluminum rotor bars, a rotor bar extension of approximately 6 inches and a length of approximately 6.5 inches for dual section 38 of end ring strips 24 have been found optimum. Typically, nose 40 may protrude outwardly to a length of 1 inch while L-shaped sections may extend to a length of 1.2 inches. Because the radial height of sections 38 desirably is approximately double the radial height of the rotor bars and one-half the rotor bar thickness, the conductivity of the end ring strips is approximately equal to the conductivity of the rotor bars. The elongated length of the strips when taken in conjunction with the rotor bar extension, however, assures a majority of the generated heat is produced outside the rotor laminations thereby easing the problem of heat removal from the motor.

I claim

1. In a dynamoelectric machine, the combination comprising a rotor formed of a plurality of juxtaposed magnetic laminations stacked in alignment upon a rotor shaft to provide axially aligned conductor slots therein, a plurality of conductor bars inserted through said conductor slots and protruding from at least one end of said juxtaposed rotor laminations, a plurality of bifurcated end ring strips interconnecting the protruding ends of adjacent rotor conductors, each of said bifurcated strips having dual elongated bodies connected at one end to adjacent ones of said rotor conductors and interconnected at the end of said strips remote from said rotor conductors, the thickness of at least a portion of the sides of said bifurcated end ring strips being linearly increased with radial departure from said shaft to maximize contact between said juxtaposed strips, said strips being further characterized by a nose extending axially outwardly from the interconnected end of said strips and said strips are provided with a recess to form a pocket between juxtaposed strips, weld material securing the protruding ends of the rotor conductors within the pockets formed between adjacent strips, and support means secured to said rotor for restraining said protruding noses of said strips to inhibit movement of said bifurcated strips in both a radial and an arcuate direction.

2. A dynamoelectric machine according to claim 1 wherein said protruding noses have a cross-sectional configuration substantially identical to the cross-sectional configuration of said rotor conductors and said support wheel is formed of a magnetic rotor laminations.

3. In a dynamoelectric machine, the combination comprising a rotor formed of a plurality of juxtaposed magnetic laminations stacked in alignment upon a rotor shaft to provide axially registered slots therein, a plurality of aluminum conductor bars extending through said slots and protruding from at least one end of said juxtaposed rotor laminations, end ring strips interconnecting adjacent conductor bars of said rotor, said strips having juxtaposed elongated bodies characterized by a radial height at least twice the radial height of said rotor conductor bars, pockets protruding outwardly from one end of said strips proximate said rotor conductor bars to receive the protruding ends of said conductor bars therein, each of said bodies having an enhanced thickness at the end of said strips proximate said pockets to radially distribute current from said conductor bars within said strips, said enhanced thickness tapering gradually into said strips to eliminate the formation of a stress riser adjacent said pockets, means securing said conductor bars within said pockets, means at the end of said strips remote from said conductor bars for electrically interconnecting strips connected to adjacent conductor bars and means for restraining said strips from movement in a radial direction.

4. A dynamoelectric machine according to claim 3 wherein said strips have a plurality of noses protruding outwardly from the interconnected ends of said strip, each of said noses being geometrically identical in configuration to said rotor conductor bars and said restraining means include a support wheel having magnetic laminations identical to said rotor laminations, each of said protruding noses being secured within a conductor slot of the laminations forming said support wheel.

5. A dynamoelectric machine according to claim 4 further including a second magnetic rotor lamination situated between said rotor and said end ring strips to restrain radial movement of said conductor bars and further including insulating means electrically isolating said conductor bars from said slots in said laminations.

6. A dynamoelectric machine according to claim 3 wherein the ends of said rotor conductor bars within said pockets are tapered and further including weld material overlying said tapered ends of said conductor to secure said conductors within said pockets.

* * * * *